United States Patent
Asano et al.

(10) Patent No.: US 12,044,600 B2
(45) Date of Patent: Jul. 23, 2024

(54) GAS FLOW RATE ESTIMATION DEVICE, GAS FLOW RATE ESTIMATION METHOD, AND GAS FLOW RATE ESTIMATION PROGRAM

(71) Applicant: Konica Minolta, Inc., Tokyo (JP)

(72) Inventors: Motohiro Asano, Osaka (JP); Takashi Morimoto, Suita (JP)

(73) Assignee: KONICA MINOLTA, INC., Tokyo (JP)

( * ) Notice: Subject to any disclaimer, the term of this patent is extended or adjusted under 35 U.S.C. 154(b) by 558 days.

(21) Appl. No.: 17/297,857

(22) PCT Filed: Sep. 9, 2019

(86) PCT No.: PCT/JP2019/035312
§ 371 (c)(1),
(2) Date: May 27, 2021

(87) PCT Pub. No.: WO2020/110411
PCT Pub. Date: Jun. 4, 2020

(65) Prior Publication Data
US 2022/0034742 A1 Feb. 3, 2022

(30) Foreign Application Priority Data
Nov. 28, 2018 (JP) .................. 2018-222126

(51) Int. Cl.
*G01M 3/04* (2006.01)
*G01J 5/00* (2022.01)
(Continued)

(52) U.S. Cl.
CPC .............. *G01M 3/04* (2013.01); *G01J 5/00* (2013.01); *G01J 5/0014* (2013.01); *G01M 3/16* (2013.01);
(Continued)

(58) Field of Classification Search
CPC ............ G01M 3/04; G01M 3/16; G01M 3/18; G01M 3/38; G01J 5/00; G01J 5/0014; G01J 2005/0077; G06T 7/20
See application file for complete search history.

(56) References Cited

U.S. PATENT DOCUMENTS

| 9,225,915 B2 | 12/2015 | Zeng et al. |
| 2020/0116583 A1* | 4/2020 | Hedberg ............ G01N 21/3504 |
| 2020/0138292 A1* | 5/2020 | Choi ...................... A61B 5/091 |

OTHER PUBLICATIONS

Sandsten, Jonas et al. "Volume flow calculations on gas leaks imaged with infrared gas-correlation", Optics Express 20318, vol. 20, No. 18, Aug. 27, 2012. (Year: 2012).*
(Continued)

*Primary Examiner* — Paul M. West
(74) *Attorney, Agent, or Firm* — CANTOR COLBURN LLP

(57) ABSTRACT

A gas flow rate estimation device includes a first calculation unit that calculates, by using an average movement vector of a gas region included in an image, a gas passage time for leaked gas to pass through the gas region, a second calculation unit that calculates a gas volume in the gas region by using a gas concentration thickness product of the gas region, and a third calculation unit that calculates an estimated value of a flow rate of the gas by using the gas passage time and the gas volume.

7 Claims, 12 Drawing Sheets

(51) Int. Cl.
*G01M 3/16* (2006.01)
*G01M 3/18* (2006.01)
*G01M 3/38* (2006.01)
*G06T 7/20* (2017.01)

(52) U.S. Cl.
CPC ............... *G01M 3/18* (2013.01); *G01M 3/38* (2013.01); *G01J 2005/0077* (2013.01); *G06T 7/20* (2013.01)

(56) References Cited

OTHER PUBLICATIONS

Harley, Jacob, Thesis "Remote Quantification of Smokestack Total Effluent Mass Flow Rates Using Imaging Fourier—Transform Spectroscopy", Air Force Institute of Technology, Mar. 2011. (Year: 2011).*

International Search Report for International Application No. PCT/JP2019/035312; Date of Mailing, Oct. 29, 2019.

* cited by examiner

GAS FLOW RATE ESTIMATION DEVICE, GAS FLOW RATE ESTIMATION METHOD, AND GAS FLOW RATE ESTIMATION PROGRAM

CROSS REFERENCE TO RELATED APPLICATIONS

This is the U.S. national stage of application No. PCT/JP2019/035312, filed on Sep. 9, 2019. Priority under 35 U.S.C. § 119(a) and 35 U.S.C. § 365(b) is claimed from Japanese Application No. 2018-222126, filed Nov. 28, 2018, the disclosure of which is also incorporated herein by reference.

TECHNICAL FIELD

The present invention relates to a technique for estimating a flow rate of leaked gas.

BACKGROUND ART

If the flow rate of leaked gas can be estimated when a gas leak occurs, this estimation can be used as a guide for determining the degree of danger (for example, gas explosion). A technique has been proposed, based on a gas region included in an image taken by a camera, to estimate a depth of a gas cloud (thickness of the gas cloud with respect to an image-capturing direction), set a virtual plane perpendicular to a moving direction of the gas cloud, and estimate a mass leak rate of the leaked gas per hour from the mass of the gas cloud passing through the virtual plane within a predetermined time and the moving speed of the gas cloud (see, for example, Patent Literature 1).

The present inventors have studied a technique capable of estimating a gas flow rate relatively easily based on a gas region included in an image on a principle different from the technique of Patent Literature 1.

CITATION LIST

Patent Literature

Patent Literature 1: U.S. Pat. No. 9,225,915

SUMMARY OF INVENTION

It is an object of the present invention to provide a gas flow rate estimation device, a gas flow rate estimation method, and a gas flow rate estimation program that can estimate a gas flow rate relatively easily based on a gas region included in an image.

In order to achieve the above-described object, a gas flow rate estimation device reflecting one aspect of the present invention has a first calculation unit, a second calculation unit, and a third calculation unit. The first calculation unit calculates, by using an average movement vector of a gas region included in an image, a gas passage time for leaked gas to pass through the gas region. The second calculation unit calculates a gas volume in the gas region by using a gas concentration thickness product of the gas region. The third calculation unit calculates an estimated value of a flow rate of the gas by using the gas passage time and the gas volume.

The advantages and features provided by one or more embodiments of the invention are fully understood from the detailed description and accompanying drawings provided below. These detailed descriptions and accompanying drawings are given by way of example only and are not intended as a limited definition of the present invention.

DESCRIPTION OF EMBODIMENTS

Figure 1A:
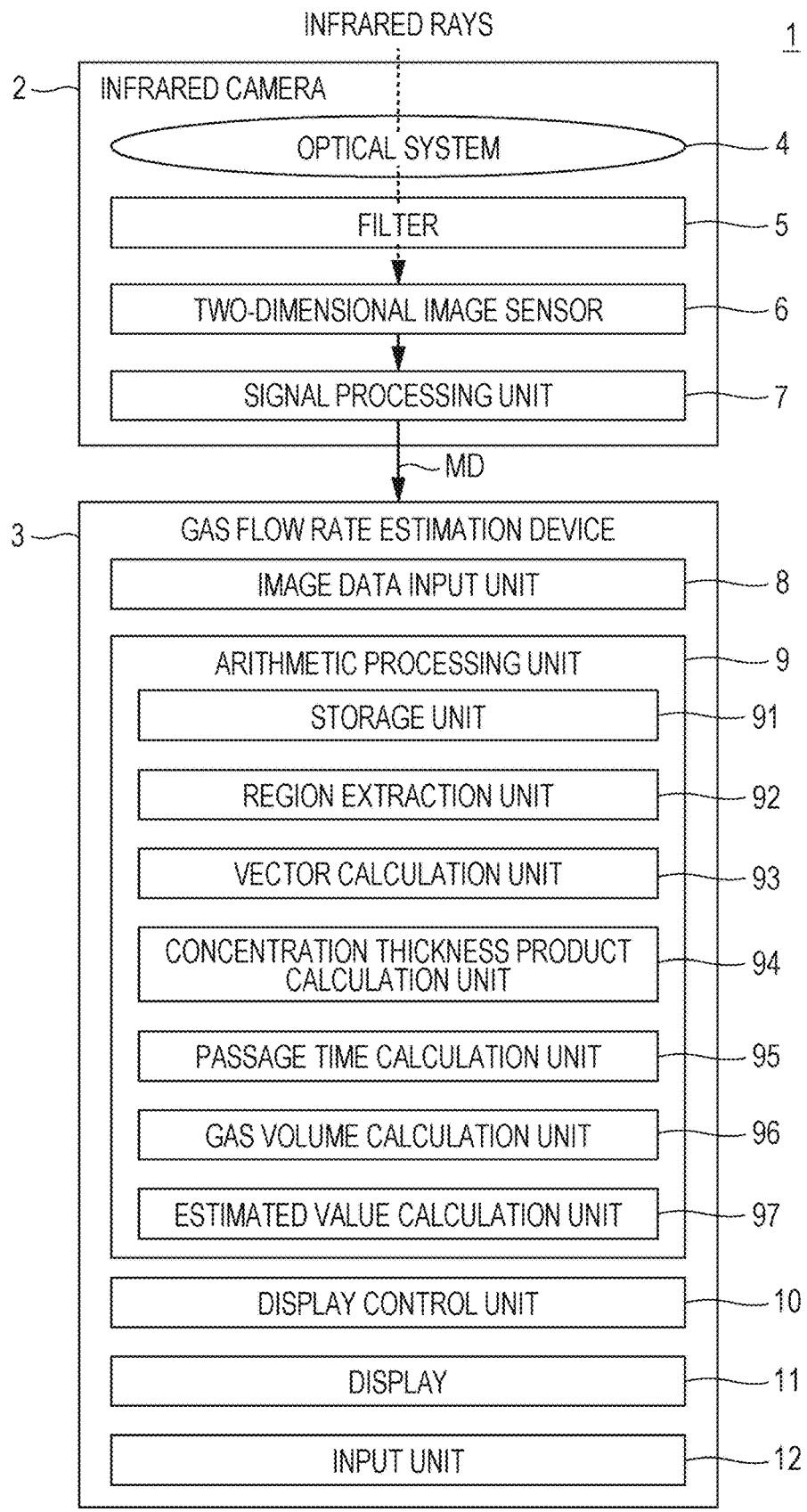
FIG. 1A is a block diagram illustrating a configuration of a gas flow rate estimation system according to an embodiment.

Hereinafter, one or more embodiments of the present invention will be described with reference to the drawings. However, the scope of the invention is not limited to the disclosed embodiments.

In the drawings, components with the same reference numerals indicate that they are the same components, and the description of the components already described will be omitted. In the present description, a generic term is indicated by a reference code omitting a hyphen (for example, image Im2), and an individual component is indicated by a reference code with a hyphen (for example, image Im2-1).

FIG. 1A is a block diagram illustrating a configuration of a gas flow rate estimation system 1 according to an embodiment. The gas flow rate estimation system 1 includes an infrared camera 2 and a gas flow rate estimation device 3.

The infrared camera 2 captures a moving image of an infrared image of a subject including a gas leak monitoring target for gas leak (for example, a location where gas transport pipes are connected to each other), and generates moving image data MD depicting the moving image. It is only necessary to be a plurality of infrared images captured in time series, and it is not limited to moving images. The infrared camera 2 includes an optical system 4, a filter 5, a two-dimensional image sensor 6, and a signal processing unit 7.

The optical system 4 forms an infrared image of a subject on the two-dimensional image sensor 6. The filter 5 is arranged between the optical system 4 and the two-dimensional image sensor 6, and allows only infrared rays having specific wavelengths to pass through from light that has passed through the optical system 4. Among infrared wavelength bands, a wavelength band that the filter 5 allows passage depends on the type of gas to be detected. For example, in the case of methane, the filter 5 that allows passage in a wavelength band of 3.2 to 3.4 μm is used. The two-dimensional image sensor 6 is, for example, a cooled indium antimonide (InSb) image sensor, and receives infrared rays that have passed through the filter 5. The signal processing unit 7 converts an analog signal output from the two-dimensional image sensor 6 into a digital signal, and performs publicly known image processing. This digital signal becomes the moving image data MD.

The gas flow rate estimation device 3 is a personal computer, a smartphone, a tablet terminal, or the like, and includes an image data input unit 8, an arithmetic processing unit 9, a display control unit 10, a display 11, and an input unit 12 as functional blocks.

The image data input unit 8 is a communication interface that communicates with a communication unit (not illustrated) of the infrared camera 2. The moving image data MD sent from the communication unit of the infrared camera 2 is input to the image data input unit 8. The image data input unit 8 sends the moving image data MD to the arithmetic processing unit 9.

The arithmetic processing unit 9 obtains an estimated value of the gas flow rate by using the moving image data MD. The arithmetic processing unit 9 includes a storage unit 91, a region extraction unit 92, a vector calculation unit 93, a concentration thickness product calculation unit 94, a passage time calculation unit 95, a gas volume calculation unit 96, and an estimated value calculation unit 97.

The storage unit 91 stores the moving image data MD, various programs necessary for calculating the estimated value of the gas flow rate, and the like. The region extraction unit 92 performs image processing on the infrared image and extracts a gas region from the infrared image.

The vector calculation unit 93 calculates an average movement vector of the gas region. The average movement vector of the gas region (in other words, an image of a gas cloud) may be, for example, an average value of movement vectors of pixels constituting the gas region, or the gas region may be divided into small areas larger than one pixel (for example, 2×2 pixels), and an average value of movement vectors of the small areas may be used. All of the movement vectors may be used for calculating the average value, or an average value of sampled movement vectors (for example, a movement vector sampled every two vertical and horizontal pixels) may be used.

The concentration thickness product calculation unit 94 calculates a gas concentration thickness product for each pixel constituting the gas region, and calculates the average value thereof. This average value is an average value of the gas concentration thickness products in the gas region.

The passage time calculation unit 95 (first calculation unit) calculate a gas passage time by using the average movement vector of the gas region extracted from the infrared image (in other words, the gas region included in the image), and the leaked gas passes through a gas region.

The gas passage time is calculated, for example, by dividing a length of the gas region along a direction in which the gas flows by a length of the average movement vector. The length of the gas region along the direction in which the gas flows may be, for example, a length of a rectangle (circumscribed rectangle) of the gas region along a direction of the average movement vector, or may be a maximum value of the length of the gas region along the direction of the average movement vector.

The gas volume calculation unit 96 (second calculation unit) calculates a gas volume in the gas region by using the gas concentration thickness products in the gas region. Specifically, the gas volume calculation unit 96 calculates the gas volume in the gas region by using the area of the gas region and the average value of the gas concentration thickness products in the gas region.

The estimated value calculation unit 97 (third calculation unit) calculates an estimated value of the gas flow rate by using the gas passage time and the gas volume.

The display control unit 10 causes the display 11 to display a moving image depicted by the moving image data MD and an image calculated by the arithmetic processing unit 9 (for example, an image after extraction processing of a gas region).

The input unit 12 receives various inputs related to estimation of the gas flow rate. The gas flow rate estimation device 3 according to the embodiment includes a display control unit 10, a display 11, and an input unit 12, but may be a gas flow rate estimation device 3 that does not include these.

Figure 1B:
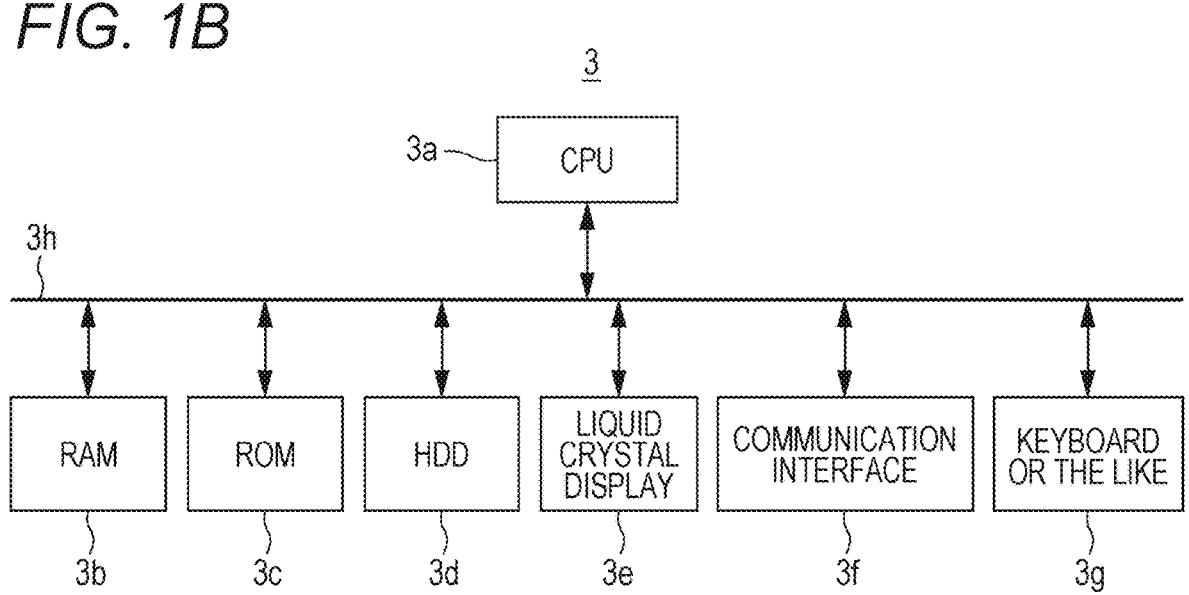
FIG. 1B is a block diagram illustrating a hardware configuration of the gas flow rate estimation system illustrated in FIG. 1A.

FIG. 1B is a block diagram illustrating a hardware configuration of the gas flow rate estimation device 3 illustrated in FIG. 1A. The gas flow rate estimation device 3 includes a central processing unit (CPU) 3a, a random access memory (RAM) 3b, a read only memory (ROM) 3c, a hard disk drive (HDD) 3d, a liquid crystal display 3e, a communication interface 3f, a keyboard or the like 3g, and a bus 3h connecting them. The liquid crystal display 3e is hardware that achieves the display 11. Instead of the liquid crystal display 3e, an organic light emitting diode display (organic EL display), a plasma display, or the like may be used. The communication interface 3f is hardware that achieves the image data input unit 8. The keyboard or the like 3g is hardware that achieves the input unit 12. A touch panel may be used instead of the keyboard.

The HDD 3d stores, for the arithmetic processing unit 9 and the display control unit 10, programs for respectively implementing these functional blocks and various data (for example, moving image data MD). The program for implementing the arithmetic processing unit 9 is an arithmetic processing program that acquires the moving image data MD and calculates the estimated value of the gas flow rate using the moving image data MD. The program for implementing the display control unit 10 is, for example, a display control program that displays a moving image depicted by the moving image data MD on the display 11 or displays an image processed by the arithmetic processing unit 9 on the display 11. These programs are pre-stored in the HDD 3d, but are not limited to this. For example, a recording medium (for example, an external recording medium such as a magnetic disk or an optical disk) for recording these programs may be prepared, and the program stored in this recording medium may be stored in the HDD 3d. Further, these programs are stored in a server connected to the gas flow rate estimation device 3 via a network, and these programs may be sent to the HDD 3d and stored in the HDD 3d via the network. These programs may be stored in the ROM 3c instead of the HDD 3d. The gas flow rate estimation device 3 includes a flash memory instead of the HDD 3d, and these programs may be stored in the flash memory.

The CPU 3a reads these programs from the HDD 3d, expands them in the RAM 3b, and executes the expanded programs to implement the arithmetic processing unit 9 and the display control unit 10. However, regarding the functions of the arithmetic processing unit 9 and the functions of the display control unit 10, some or all of the respective functions may be implemented by processing by the digital signal processor (DSP) instead of or together with processing by the CPU 3a. Similarly, a part or all of each function may be implemented by processing by a dedicated hardware circuit in place of or in combination with processing by software.

Note that the arithmetic processing unit 9 includes a plurality of elements illustrated in FIG. 1A. Therefore, the HDD 3d stores a program for implementing these elements. That is, the HDD 3d stores programs for respectively implementing the region extraction unit 92, the vector calculation unit 93, the concentration thickness product calculation unit 94, the passage time calculation unit 95, the gas volume calculation unit 96, and the estimated value calculation unit 97. These programs are expressed as a region extraction program, a vector calculation program, a concentration thickness product calculation program, a passage time calculation program, a gas volume calculation program, and an estimated value calculation program.

These programs are represented using element definitions. The passage time calculation unit 95 and the passage time calculation program will be described as an example. The passage time calculation unit 95 calculates the gas passage time for the leaked gas to pass through the gas region by using the average movement vector of the gas region included in the image. The passage time calculation program is a program that calculates the gas passage time for the leaked gas to pass through the gas region by using the average movement vector of the gas region included in the image.

A flowchart of these programs (area extraction program, vector calculation program, and the like) executed by CPU 3a is FIG. 2 to be described next.

Operation of the gas flow rate estimation device 3 will be described by taking an example of moving image data MD of an infrared image obtained by photographing an outdoor test place using an infrared camera 2. FIG. 2 is a flowchart describing this operation. FIG. 3 is an image view in which four frames selected from a frame group constituting the moving image data MD of the infrared image are arranged in chronological order. At the test site, there is a point SP where gas can be ejected. Gas is ejected at the point SP. An image Im1-1 is an infrared image (frame) captured at time T1. An image Im1-2 is an infrared image (frame) captured at time T2 0.2 seconds after time T1. An image Im1-3 is an infrared image (frame) captured at time T3 0.4 seconds after time T1. An image Im1-4 is an infrared image (frame) captured at time T4 0.6 seconds after time T1.

Figure 4:
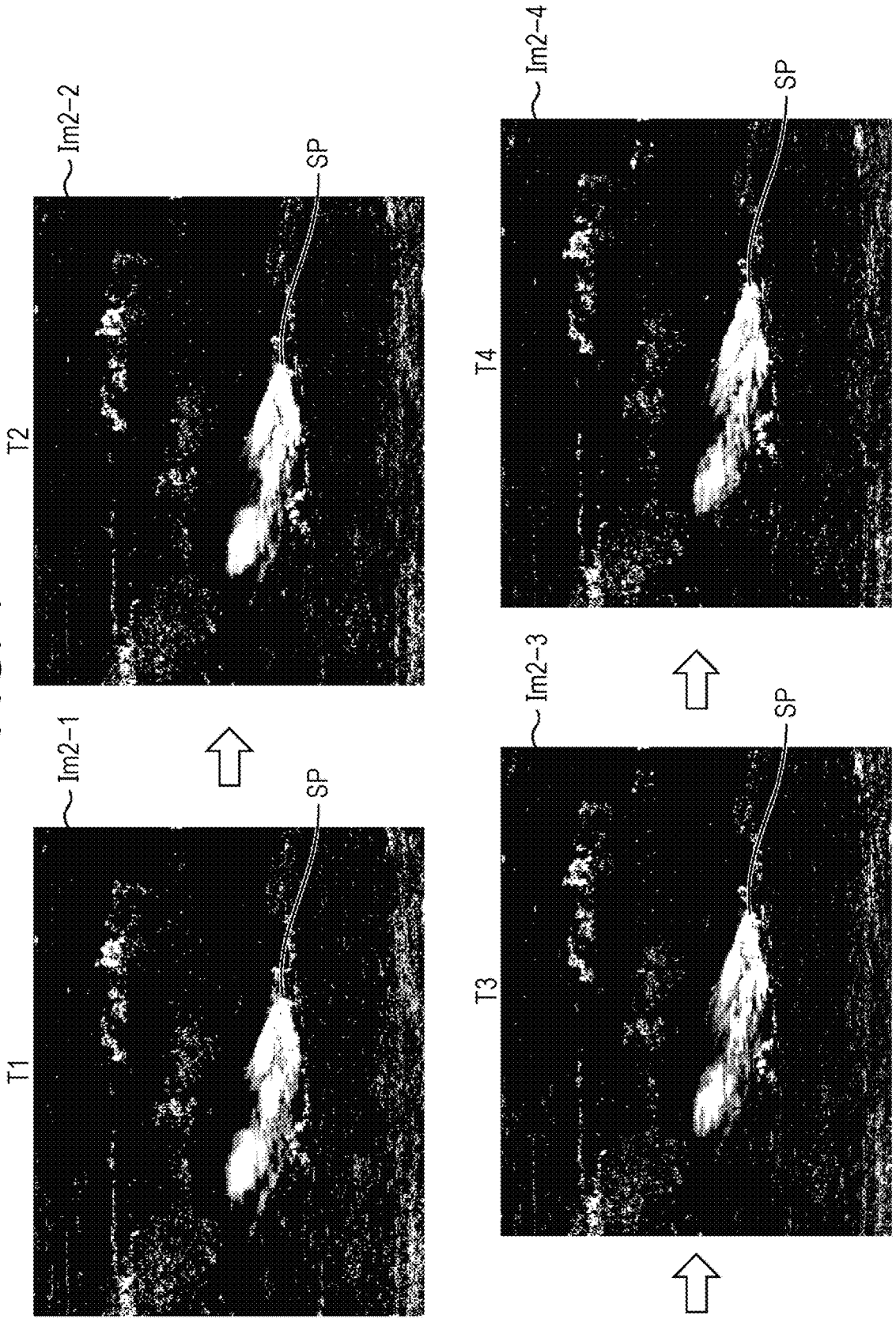
FIG. 4 is an image view illustrating images, on which image processing to make a gas region easier to see is performed, in chronological order.

From the image Im1 (infrared image), the gas region (here, the gas region is a region that indicates the gas ejected from the point SP and floating at the test site) cannot be clearly seen. Accordingly, the region extraction unit 92 (FIG. 1A) extracts the gas region included in the image Im1 (step S1 in FIG. 2). This will be described in detail. The region extraction unit 92 performs image processing that makes it easy to see the gas region included in each image Im1. FIG. 4 is an image view illustrating images Im2, on which this image processing is performed, in chronological order.

With reference to FIGS. 3 and 4, an image Im2-1 is an image on which the image processing that makes it easy to see the gas region included in the image Im1-1 is performed.

An image Im2-2 is an image on which the image processing that makes it easy to see a gas region contained in image Im1-2 is performed. An image Im2-3 is an image on which the image processing that makes it easy to see the gas region contained in the image Im1-3. An image Im2-4 is an image on which the image processing that makes it easy to see the gas region contained in the image Im1-4. A white area extending in a center portion of the image Im2 is the gas region. It can be seen that the gas flows from right to left starting from the point SP. In image Im2, the right side is windward and the left side is leeward. The gas region is, in other words, an image of a gas cloud.

A publicly known technique can be applied to the image processing that makes it easy to see the gas region. For example, this publicly known technique is disclosed in WO2017073430. This internationally published technique is invented by the present inventors, and specifically discloses an image processing device for gas detection that performs image processing on infrared images of a gas leak monitoring target captured at a plurality of times, and includes an image processing unit that performs a process to remove, from image data depicting the infrared images, second frequency component data representing temperature variations in the background of the monitoring target, the second frequency component data having a lower frequency than first frequency component data representing temperature variations due to leaked gas.

Further, although it is not a technique invented by the present inventors, for example, Japanese Patent Application Laid-Open No. 2012-58093 discloses a gas leak detection device characterized by having an infrared camera that captures an inspection target area in a gas leak detection device that detects a gas leak in an inspection target area, and an image processing unit that processes infrared images taken by the infrared camera, in which the image processing unit has a fluctuation extraction unit that extracts dynamic fluctuations due to gas leaks from a plurality of infrared images arranged in time series.

The region extraction unit 92 selects an image Im2 that constitutes a moving image for a predetermined period (for example, one second) from the images Im2 arranged in a time series. The region extraction unit 92 may select, for example, the image Im2-1 at time T1, the image Im2-2 at time T2 when 0.2 seconds have passed since time T1, the image Im2-3 at time T3 when 0.4 seconds have passed since time T1, the image Im2-4 at time T4 when 0.6 seconds have passed since time T1, and an image Im2-5 (not illustrated) at time T5 when 0.8 seconds have passed since time T1.

Figure 5:
FIG. 5 is an image view illustrating an example of an image constituted of maximum pixel values.

The region extraction unit 92 uses these images Im2 (images Im2-1 to Im2-5) to generate an image Im3 composed of maximum pixel values. FIG. 5 is an image view illustrating an example of the image Im3. The generation of image Im3 will be described in detail. The region extraction unit 92 determines a maximum value indicated by pixels from pixels located in the same order in these images Im2. The region extraction unit 92 sets this maximum value as a value of pixels located in the above order of the image Im3. Describing specifically, the region extraction unit 92 determines the maximum value of values indicated by first pixels in these images Im2, and sets this value as a value of a first pixel of the image Im3. The region extraction unit 92 determines a maximum value of values indicated by second pixels in these images Im2, and sets this value as a value of a second pixel of the image Im3. The region extraction unit 92 performs a similar process for third and subsequent pixels.

Figure 6:
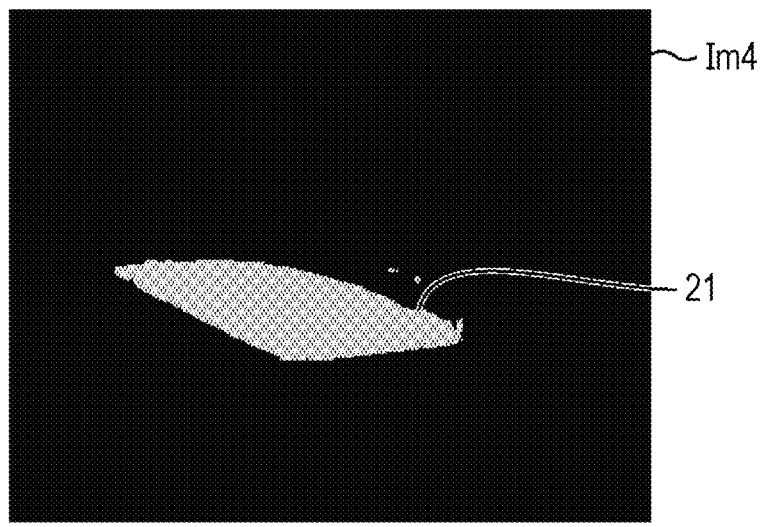
FIG. 6 is an image view illustrating an example of an image in which a noise removal and binarization process are performed on the image illustrated in FIG. 5.

The region extraction unit 92 generates an image Im4 that has been subjected to noise removal and binarization process on the image Im3. FIG. 6 is an image view illustrating an example of the image Im4. The image Im4 is an image from which a gas region 21 is extracted.

Note that the extraction method of the gas region 21 is not limited to the above-mentioned method. Further, the user may specify the gas region 21. By doing so, extraction of the gas region 21 becomes unnecessary.

Figure 2:
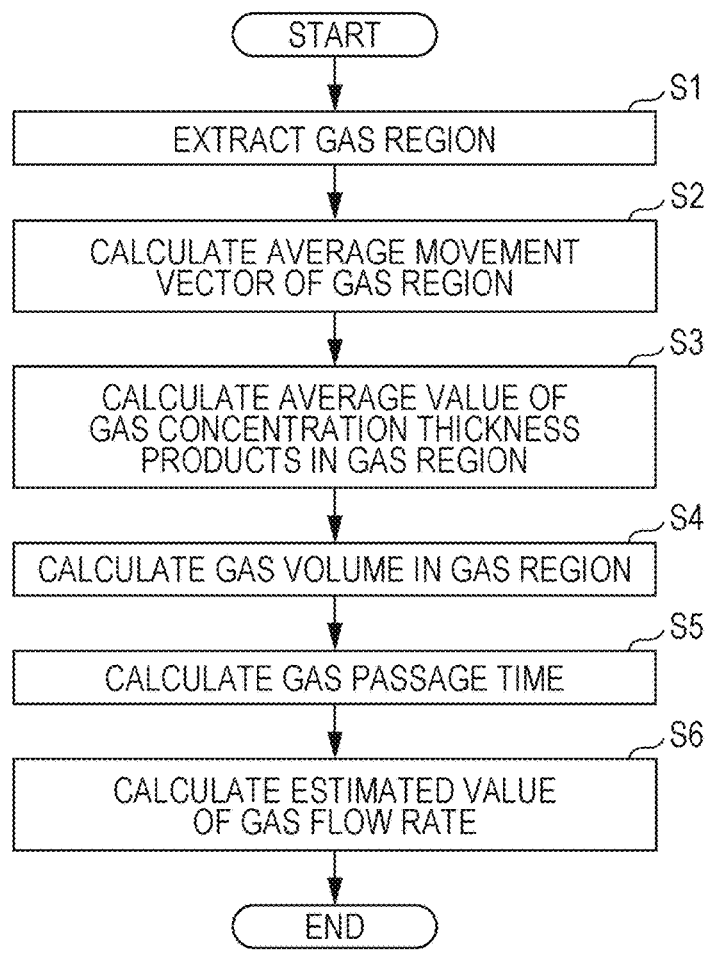
FIG. 2 is a flowchart describing operation of the gas flow rate estimation device according to the embodiment.
Figure 3:
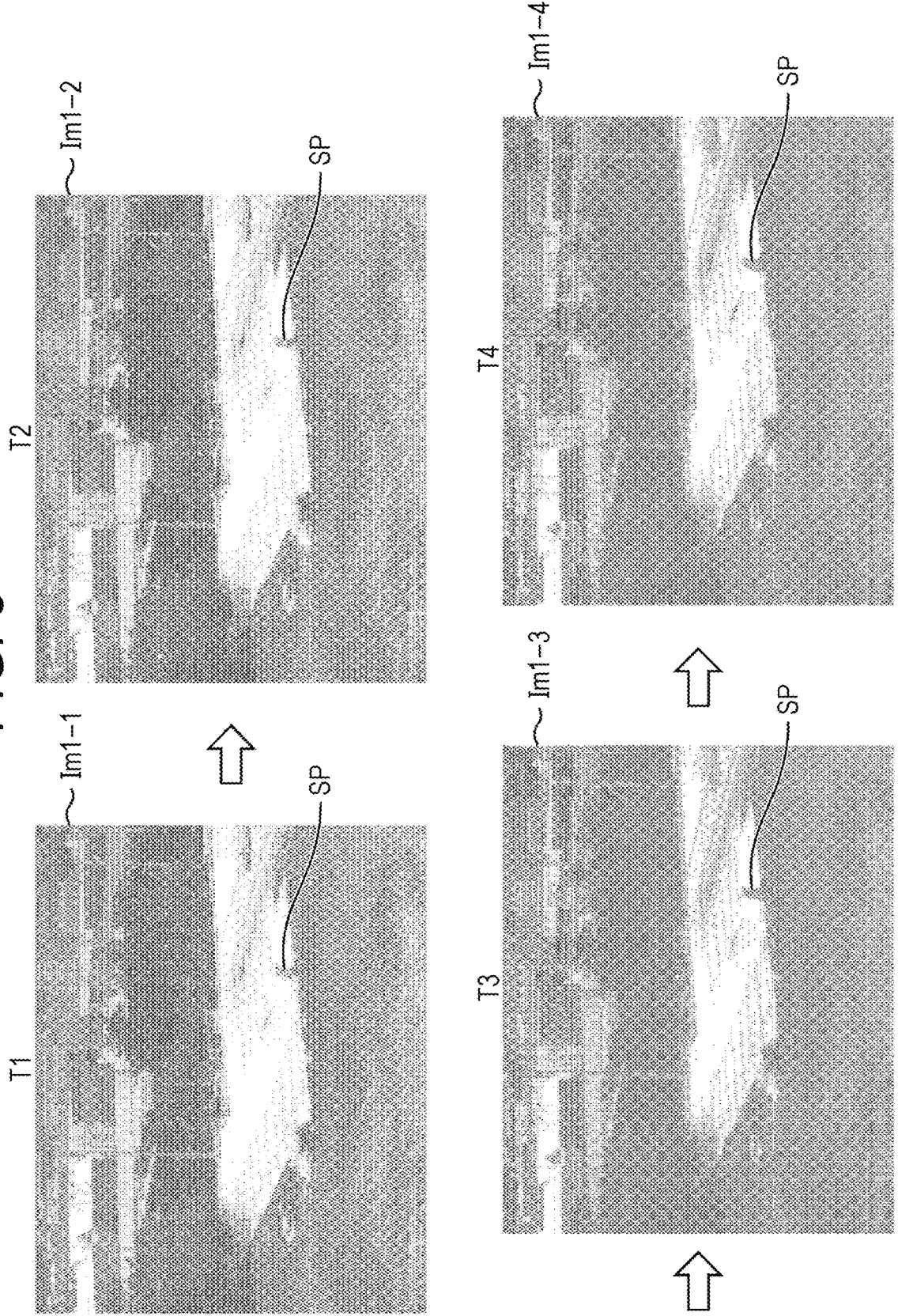
FIG. 3 is an image view in which four frames selected from a group of frames constituting moving image data of an infrared image are arranged in chronological order.
Figure 7:
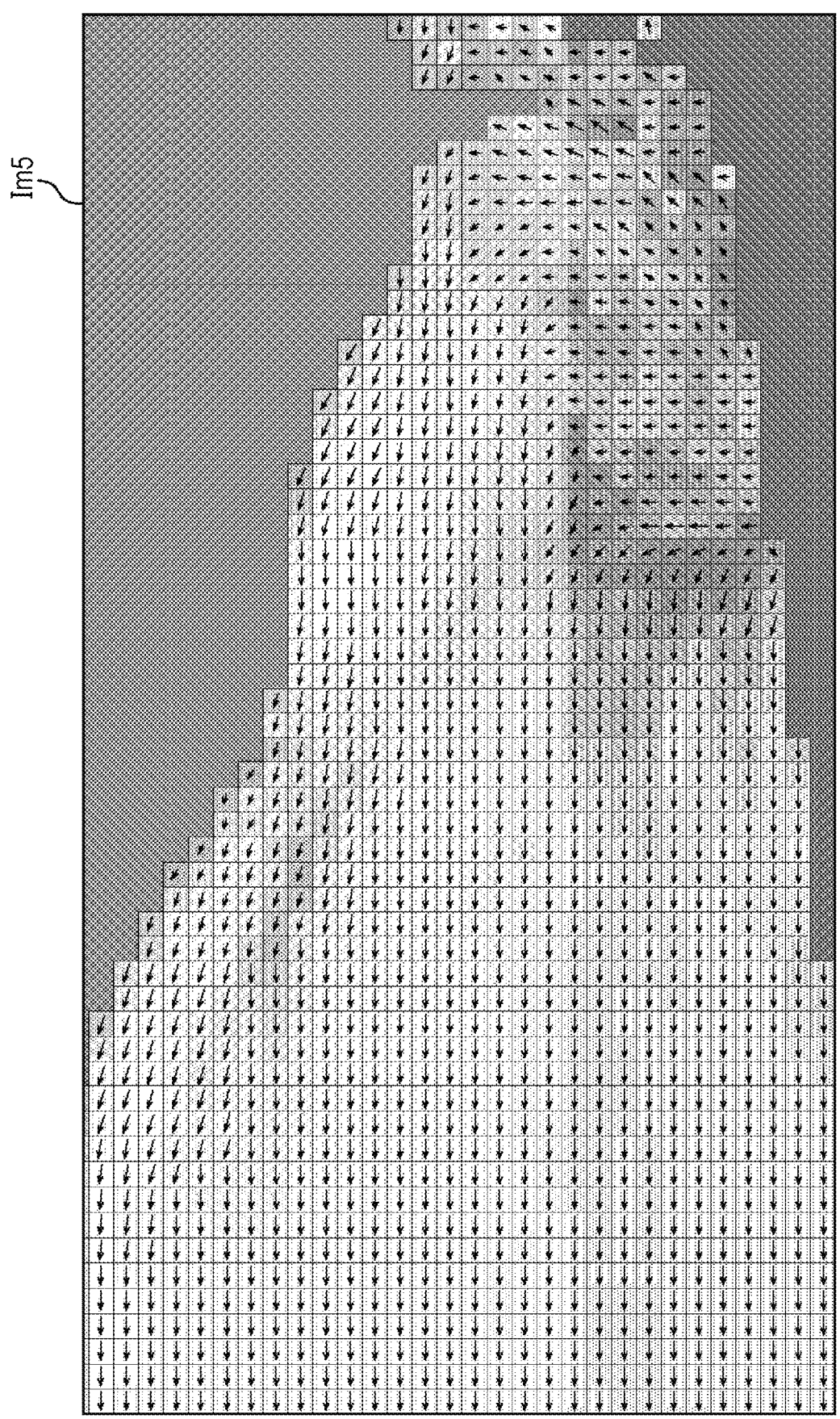
FIG. 7 is a partially enlarged schematic view of a gas region in an image illustrating an optical flow of the image illustrated in FIG. 4.

The vector calculation unit 93 (FIG. 1A) calculates an average movement vector of the gas region 21 extracted by the region extraction unit 92 (step S2 in FIG. 2). This will be described in detail. First, the vector calculation unit 93 generates an optical flow using two images Im2 (FIG. 4) at different times. FIG. 7 is a partially enlarged schematic view of the gas region 21 in an image Im5 illustrating the optical flow of the image Im2 illustrated in FIG. 4. Here, it is assumed that an optical flow is generated when proceeding from the image Im2-1 at time T1 to the image Im2-4 at time T4. An arrow included in each pixel indicates the movement vector of each pixel. The movement vector indicates the movement direction and the movement amount of each pixel.

Note that the calculation of the movement vector is not limited to the optical flow. The movement vector may be calculated using, for example, template matching. The template matching includes, for example, sum of absolute difference (SAD) and normalized cross-correlation (NCC). The calculation of the movement vector using the template matching will be described in detail by taking the image Im2-1 at time T1 and the image Im2-2 at time T2 illustrated in FIG. 4 as examples. The vector calculation unit 93 performs template matching of a large number of feature points (for example, edges) included in the image Im2-1 at time T1 using the image Im2-2 at time T2, and calculates movement vectors of these feature points. A feature point is a region constituted of a plurality of pixels instead of one pixel (for example, 5 pixels×5 pixels). Therefore, for example, the movement vector of a feature point A is the movement vector of each of a plurality of pixels constituting the feature point A. As described above, the movement vector of each pixel constituting the image Im2-1 is calculated. Note that the region constituted of pixels of FIG. 4 may be processed as it is without using the feature points such as edges.

Figure 8:
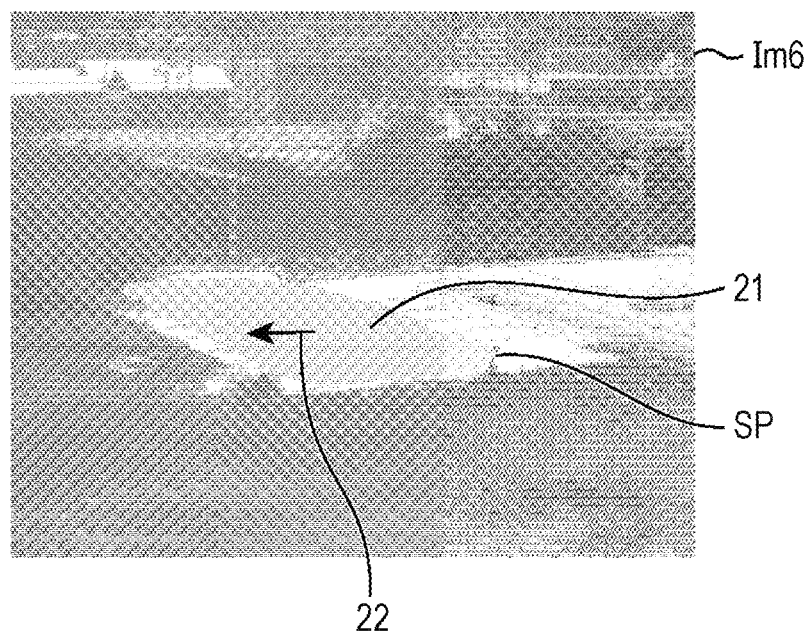
FIG. 8 is an image view illustrating an image in which a gas region and an average movement vector are combined with the infrared image illustrated in FIG. 3.

The vector calculation unit 93 calculates the average value of movement vectors for pixels constituting a region corresponding to the gas region 21 (FIG. 6) in the image Im5. This value indicates the average movement vector of the gas region 21. Here, the average movement vector is 25.5 pix/sec (2.4 m/sec). FIG. 8 is an image view illustrating an image Im6 in which the gas region 21 and an average movement vector 22 are combined with the infrared image Im1.

The concentration thickness product calculation unit 94 (FIG. 1A) calculates the average value of the gas concentration thickness products of the gas region 21 illustrated in FIG. 6 (step S3 in FIG. 2). This will be described in detail. First, the concentration thickness product calculation unit 94 calculates the concentration thickness product of gas for each pixel constituting the gas region 21 (FIG. 6) based on the image Im2 (FIG. 4). When a gas leak is detected, it is necessary to determine the degree of danger of the gas (for example, the possibility of explosion). The degree of danger of gas can be determined by gas concentration in the space where the gas is floating. However, in remote gas detection using the infrared camera 2, it is not possible to directly measure the gas concentration in the space where the gas is floating, and a concentration thickness product of the gas is calculated. The concentration thickness product of gas means a value obtained by integrating the concentration of gas along a depth direction of the space where the gas is floating.

A publicly known technique can be applied to the calculation of the concentration thickness product of gas. For example, this publicly known technique is disclosed in WO2017104607 (FIG. 37 and FIG. 38). This internationally published technique is invented by the present inventors, and specifically, there is disclosed a gas concentration thickness product measuring device that measures a concentration thickness product of gas using an infrared image constituted of a plurality of pixels, the gas concentration thickness product measuring device including an image data input unit that inputs image data depicting a plurality of infrared images obtained by capturing the infrared image as a gas leak monitoring target at a plurality of times, a first determination unit that generates time-series pixel data in which pixel data of the pixels at the same position are arranged in time series in the plurality of infrared images input from the image data input unit and, based on the time-series pixel data of a predetermined pixel of the plurality of pixels, determines a background temperature with gas indicating a background temperature when there is gas in the region corresponding to the predetermined pixel, and a background temperature without gas indicating a background temperature when there is no gas in the predetermined region.

The background temperature with gas and the background temperature without gas are parameters for obtaining a gas concentration thickness product, and FIG. 37 and FIG. 38 attached to the above-mentioned internationally published description describe equations for calculating the gas concentration thickness product. By substituting the background temperature with gas and the background temperature without gas into these equations, the gas concentration thickness product can be calculated.

If there is a pixel for which it is difficult to calculate the gas concentration thickness product due to edge noise or the like among pixels that constitute the gas region 21, the concentration thickness product calculation unit 94 does not calculate the gas concentration thickness product for this pixel. This is because the average value of the gas concentration thickness products can be calculated even if the gas concentration thickness product cannot be calculated for some of pixels constituting the gas region 21.

Note that the technique for calculating the gas concentration thickness product is not limited to the technique disclosed in the above-mentioned international publication.

The concentration thickness product calculation unit 94 uses the calculated concentration thickness products of the gas to calculate the average value of them. It is assumed as the average value of the gas concentration thickness products with respect to the gas region 21. Here, the average value of the gas concentration thickness products is, for example, 0.285% LELm. LEL indicates a lower explosive limit. The lower explosive limit is the minimum concentration at which a flammable gas mixed with air explodes by ignition. 100% LEL means that the lower explosive limit has been reached. In a case of methane, when the concentration reaches 5%, it becomes 100% LEL. The concentration thickness product of the gas is expressed in LELm. m denotes the distance in the depth direction.

Figure 9:
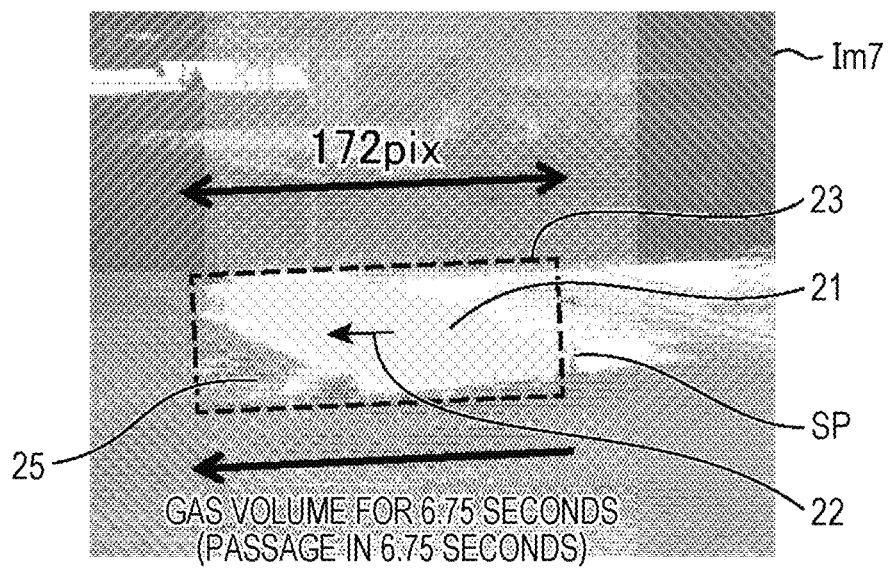
FIG. 9 is an image view illustrating an image in which a circumscribed rectangle of a gas region is set to the image illustrated in FIG. 8.

In order to calculate an estimated value of a gas flow rate, it is necessary to calculate the gas volume in the gas region 21 (FIG. 6) and the gas passage time. This will be described. FIG. 9 is an image view illustrating an image Im7 in which a circumscribed rectangle 23 of the gas region 21 is set to the image Im6 illustrated in FIG. 8. The gas leaked from the leak source (here, the gas ejected from a point SP) diffuses while passing through the gas region 21, and passes through the gas region 21. The time for the gas leaked from the leak source to pass through the gas region 21 is defined as the gas passage time. In FIG. 9, 6.75 seconds are described as an example of the gas passage time.

Figure 10:
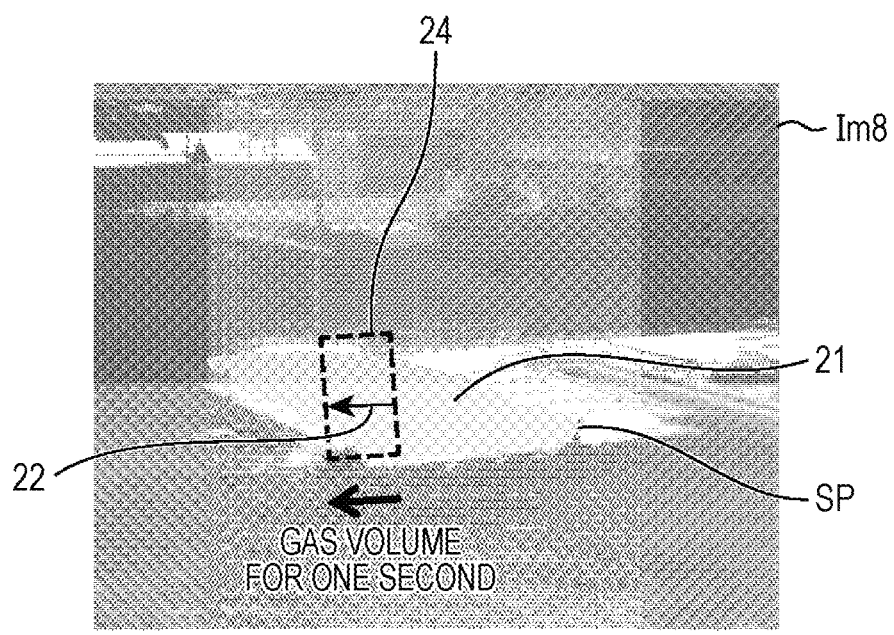
FIG. 10 is an image view illustrating an image in which a rectangle is set in the gas region with respect to the image illustrated in FIG. 8.

FIG. 10 is an image view illustrating an image Im8 in which a rectangle 24 is set in the gas region 21 with respect to the image Im6 illustrated in FIG. 8. With reference to FIGS. 9 and 10, the circumscribed rectangle 23 becomes a rectangle 24 when its longitudinal direction is sized to correspond to one second. The rectangle 24 indicates a gas volume for one second (that is, a gas flow rate). A value obtained by dividing the gas volume in the gas region 21 by the gas passage time can be assumed as the gas flow rate (estimated value of the gas flow rate). Therefore, the estimated value of the gas flow rate is expressed by following Equation 1.

Estimated value of gas flow rate=gas volume/gas passage time      Equation 1

The gas volume calculation unit 96 (FIG. 1A) calculates the gas volume in the gas region 21 by using the average value of the gas concentration thickness products and the area of the gas region 21 (step S4 in FIG. 2). The gas volume is expressed by following Equation 2.

Gas volume=area of gas region×average value of gas concentration thickness products      Equation 2

The area of the gas region 21 is 5032 (pix)$^2$ in terms of the number of pixels. The area corresponding to one pixel is $[0.09219 \text{ m/pix}]^2$. In this case, the area of the gas region 21 is 42.77 m$^2$.

$$5032(\text{pix})^2 \times [0.09219 \text{ m/pix}]^2 = 42.77 \text{ m}^2$$

The length corresponding to one pixel (here, 0.09219 m) may be fixed or may be changed according to the distance from the infrared camera 2 to the gas cloud in the gas region 21. The area of the gas region 21 can be calculated more accurately by the latter.

The average value of the gas concentration thickness products is 0.285% LELm as described above. To align the units, % LEL is removed from 0.285% LELm. This will be described by taking methane as an example. In a case of methane, the concentration of 5%, that is, 0.05 is 100% LEL, and hence 1% LEL is 0.0005. Therefore, when % LEL is removed from 0.285% LELm, it becomes 1.425×10$^{-4}$ m.

$$0.285\% \text{ LELm} \times 0.0005 = 1.425 \times 10^{-4} \text{ m}$$

All of the gas concentration thickness products of the pixels constituting the gas region 21 may be used for calculating the average value of the gas concentration thickness products, or an abnormal value among the gas concentration thickness products of the pixels constituting the gas region 21 may be omitted.

The gas volume calculation unit 96 substitutes 42.77 m$^2$ and 1.425×10$^{-4}$ m into Equation 2. Thus, the gas volume is calculated to be 6.095 L.

$$42.77 \text{ m}^2 \times 1.425 \times 10^{-4} \text{ m} = 6.095 \times 10^{-3} \text{ m}^3 = 6.095 \text{ L}$$

The passage time calculation unit 95 (FIG. 1A) calculates the gas passage time (step S5 in FIG. 2). This will be described in detail. With reference to FIG. 9, the passage time calculation unit 95 calculates the gas passage time using the number of pixels of the circumscribed rectangle 23 in a direction parallel to the average movement vector 22 and a length of the average movement vector 22. In the circumscribed rectangle 23, assuming that the pixels arranged in the parallel direction are along a direction of the average movement vector 22, the divided value of the number of pixels of the circumscribed rectangle 23 in the direction parallel to the average movement vector 22 by the length of the average movement vector 22 is the gas passage time (the time for gas leaking from a leakage source to pass through the gas region 21). Therefore, the gas passage time is expressed by following Equation 3.

Gas passage time=number of pixels of circumscribed rectangle in direction parallel to average movement vector/length of average movement vector      Equation 3

The number of pixels of the circumscribed rectangle 23 in the direction parallel to the average movement vector 22 is 172. The passage time calculation unit substitutes 172 pix and 25.5 pix/sec (length of average movement vector 22) into Equation 3. Thus, the gas passage time is calculated to be 6.75 sec.

$$172 \text{ pix}/25.5 \text{ pix;sec} = 6.75 \text{ sec}$$

The estimated value calculation unit 97 (FIG. 1A) calculates an estimated value of the gas flow rate (step S6 in FIG. 2). This will be described in detail. The estimated value calculation unit 97 substitutes 6.095 L (gas volume) and 6.75 sec (gas passage time) into Equation 1. Thus, the estimated value of the gas flow rate is calculated to be 54.2 L/min.

$$6.095 \text{ L}/6.75 \text{ sec} \times 60 = 54.2 \text{ L/min}$$

As described above, by the gas flow rate estimation device 3 according to the embodiment, the gas flow rate can be estimated relatively easily based on the gas region 21 included in the image.

The actual value of the gas flow rate is 78 L/min. The gas flow rate can be estimated to some extent. The estimated value of the gas flow rate is slightly different from the actual value of the gas flow rate because the gas region 21 has a missing part. Conversely, if the gas region 21 has no missing part, the estimated value of the gas flow rate will be closer to the actual value of the gas flow rate.

The missing part in the gas region 21 occurs for a variety of reasons. For example, when a lawn is swaying in the wind and gas flows over the lawn, the gas located above the lawn cannot be extracted as the gas region 21. This is because fluctuations of the lawn become noise and are removed as noise when the region extraction unit 92 extracts the gas region 21. The gas flowing behind the pipes, buildings, or the like cannot be extracted as the gas region 21 because they do not appear in the infrared image Im1.

For example, with reference to FIG. 9, on the downstream side of the gas flow, the gas region 21 in the circumscribed rectangle 23 is interrupted, and a non-gas region 25 exists. Since the gas is flowing in the direction indicated by the average movement vector 22 as a whole, this interruption is unnatural. In a modification example, the non-gas region 25 existing on the downstream side of the gas flow is assumed as a region where the gas region 21 is missing (missing region), and the estimated value of the gas flow rate is calculated in consideration of the non-gas region 25.

Figure 11:
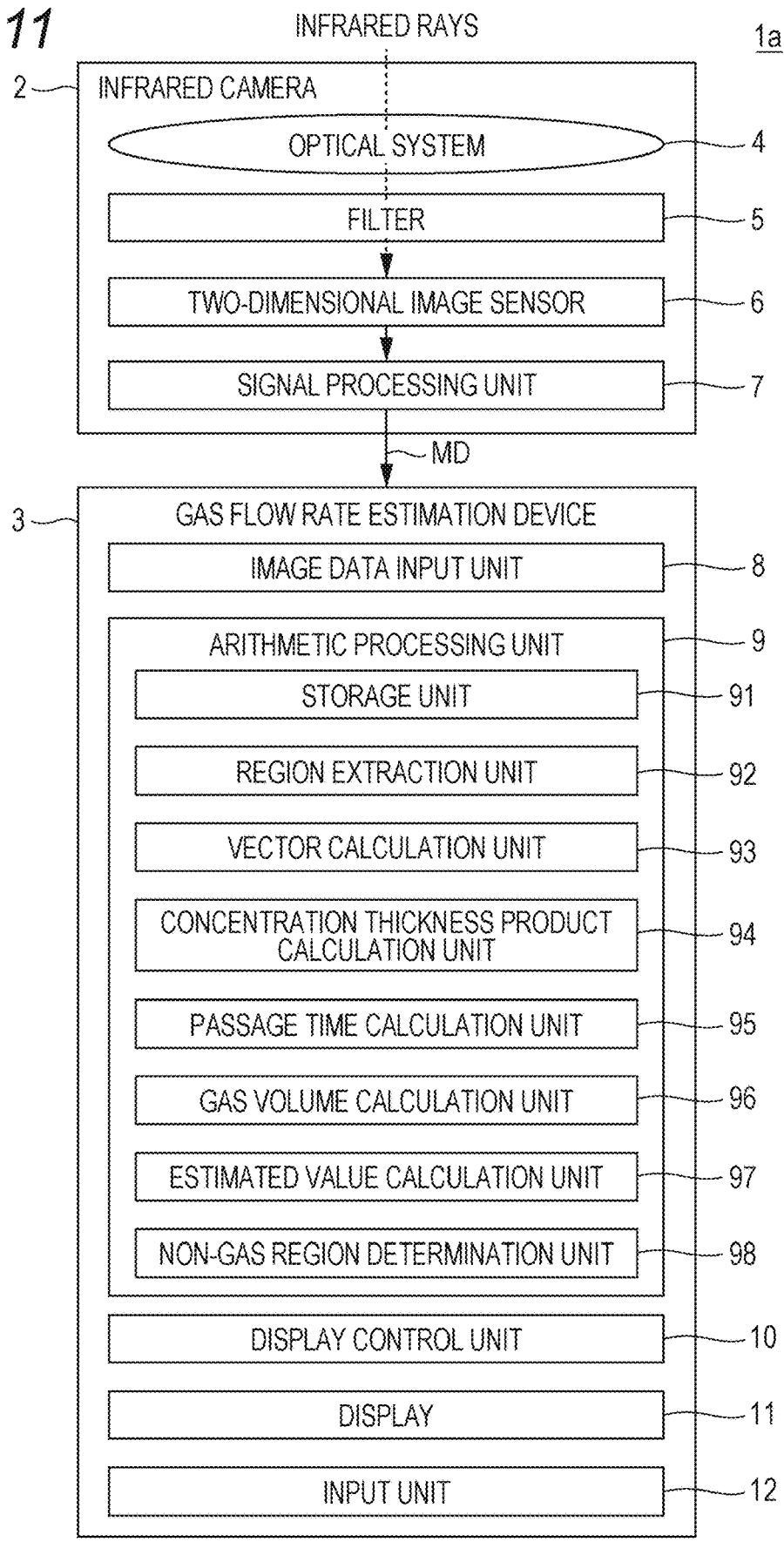
FIG. 11 is a block diagram illustrating a configuration of a gas flow rate estimation system according to a modification example.

FIG. 11 is a block diagram illustrating a configuration of a gas flow rate estimation system 1a according to the modification example. The gas flow rate estimation system 1a differs from the gas flow rate estimation system 1a illustrated in FIG. 1A in the following points. The arithmetic processing unit 9 includes a non-gas region determination unit 98 (determination unit) as a functional block. If an estimated value of the gas flow rate is calculated without considering the non-gas region 25, the estimated value may differ significantly from an actual gas flow rate. Therefore, the non-gas region determination unit 98 determines whether or not there is a non-gas region 25 on the downstream side of the gas flow.

The non-gas region 25 (FIG. 9) may be found by the non-gas region determination unit 98 or may be found by the user. A case where the non-gas region determination unit 98 finds the non-gas region 25 will be briefly described. With reference to FIG. 9, the non-gas region determination unit 98 sets the direction of the average movement vector 22 as a direction of the gas flow, and performs a search as to whether or not the non-gas region 25 exists on the downstream side of the gas region 21 (left side of the gas region 21 in FIG. 9) in the circumscribed rectangle 23. When the non-gas region determination unit 98 has found the non-gas region 25 as a result of the search, the non-gas region determination unit 98 determines that there is a non-gas region 25.

A case where the user finds the non-gas region 25 will be briefly described. When the user sees the image Im7 displayed on the display 11 and finds that there is a non-gas region 25 on the downstream side of the gas region 21 in the circumscribed rectangle 23, the user sets the range of the non-gas region 25 in the image Im7 by using the input unit 12. Thus, the non-gas region determination unit 98 determines that there is a non-gas region 25.

Figure 12:
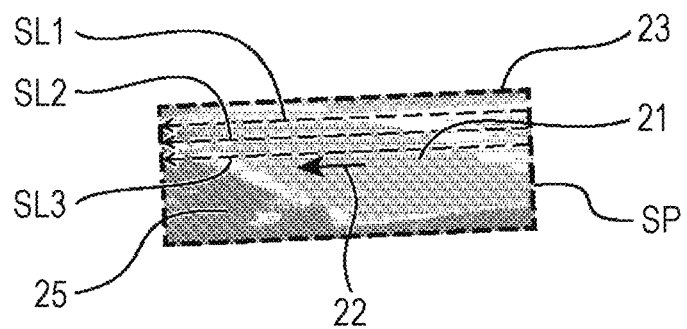
FIG. 12 is an image view illustrating a state in which an entire area inside the circumscribed rectangle is scanned.
Figure 13:
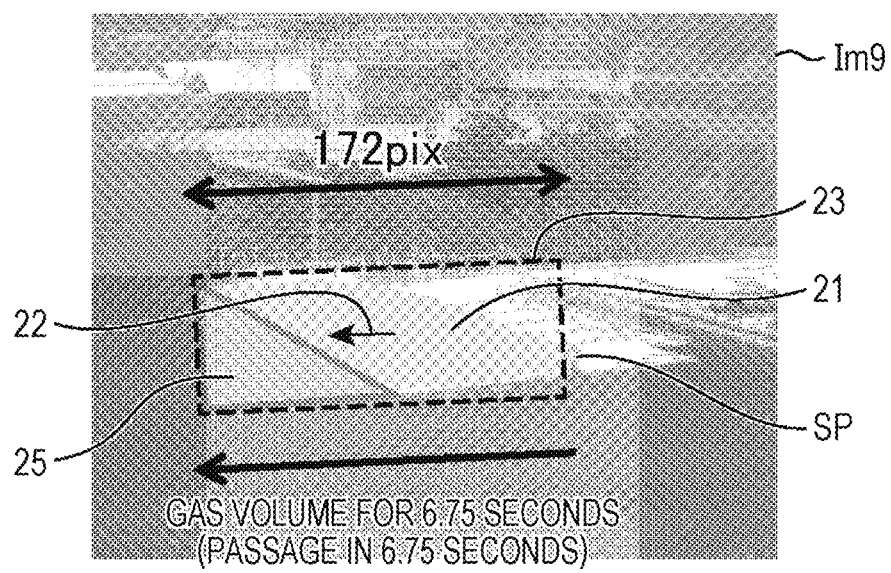
FIG. 13 is an image view illustrating an image in which a non-gas region found by scanning is combined with the image illustrated in FIG. 9.

The modification example includes a first modification example and a second modification example. The first modification example will be described first. FIG. 12 is an image view illustrating a state in which the entire area inside the circumscribed rectangle 23 is scanned. FIG. 13 is an image view illustrating an image Im9 in which the non-gas region 25 found by scanning is combined with the image Im7 illustrated in FIG. 9. In FIG. 13, in order to clarify the non-gas region 25, the non-gas region 25 is illustrated by one pixel value.

With reference to FIG. 12, the non-gas region determination unit 98 (FIG. 11) cuts out a portion in which the circumscribed rectangle 23 is set from the image Im7 illustrated in FIG. 9. The non-gas region determination unit 98 scans the entire area in the circumscribed rectangle 23 along the direction of the average movement vector 22, and performs a search as to whether or not the non-gas region 25 exists on the downstream side of the gas region 21 in the circumscribed rectangle 23. For example, scanning lines SL1, SL2, SL3 pass through a region other than the gas region, the gas region 21, and a region other than the gas region. The scanning lines SL1, SL2, SL3 pass through the region other than the gas region after passing through the gas region 21, and this region is the non-gas region 25 located on the downstream side of the gas flow (FIG. 13).

In the first modification example, the non-gas region 25 is assumed as a part of the gas region 21, and the non-gas region 25 is included in the gas region 21 to calculate the gas volume. In the first modification example, the area of the gas region 21 is represented by following Equation 4.

Area of gas region=area of gas region extracted by region extraction unit+area of non-gas region    Equation 4

The area of the non-gas region 25 is 2300 $(pix)^2$ in terms of the number of pixels. As described above, the area of the gas region 21 extracted by the region extraction unit 92 is 5032 $(pix)^2$ in terms of the number of pixels. Therefore, the area of the gas region 21 is 7332 $(pix)^2$ in terms of the number of pixels. As described above, the area corresponding to one pixel is $[0.09219 \text{ m/pix}]^2$. Therefore, the area of the gas region 21 is 62.31 $m^2$.

$$7332(pix)^2 \times [0.09219 \text{ m/pix}]^2 = 62.31 \text{ m}^2$$

The gas volume calculation unit 96 (second calculation unit) substitutes 62.31 $m^2$ and $1.425 \times 10^{-4}$ m into Equation 2. Thus, the gas volume is calculated to be 8.880 L. As described above, $1.425 \times 10^4$ m is a value obtained by removing % LEL from the average value (0.285% LELm) of the gas concentration thickness products.

$$62.31 \text{ m}^2 \times 1.425 \times 10^{-4} \text{ m} = 8.880 \times 10^{-3} \text{ m}^3 = 8.880 \text{ L}$$

The gas passage time is the same as the value obtained in the above embodiment (6.75 sec).

The estimated value calculation unit 97 substitutes 8.880 L (gas volume) and 6.75 sec (gas passage time) into Equation 1. Thus, the estimated value of the gas flow rate is calculated to be 78.9 L/min.

$$8.880 \text{ L}/6.75 \text{ sec} \times 60 = 78.9 \text{ L/min}$$

Since the actual value of the gas flow rate is 78 L/min, according to the first modification example, the estimated value of the gas flow rate becomes quite close to the actual value of the gas flow rate.

A second modification example will be described. With reference to FIGS. 9 and 13, in the embodiment and the first modification example, a length of the gas region 21 along the direction of the average movement vector 22 is assumed as the number of pixels of the circumscribed rectangle 23 in the direction parallel to the average movement vector 22. Then, in the embodiment and the first modification example, the number of pixels of the circumscribed rectangle 23 in the direction parallel to the average movement vector 22 and the length of the average movement vector 22 are substituted into Equation 3 to calculate the gas passage time. However, since the non-gas region 25 (missing region) exists, the length of the gas region 21 along the direction of the average movement vector 22 is smaller than the length indicated by the number of pixels of the circumscribed rectangle 23 in the direction parallel to the average movement vector 22. In the second modification example, the maximum length of the gas region 21 along the direction of the average movement vector 22 is calculated, and the maximum length and the average movement vector 22 are substituted into Equation 3 to calculate the gas passage time.

Figure 14A:
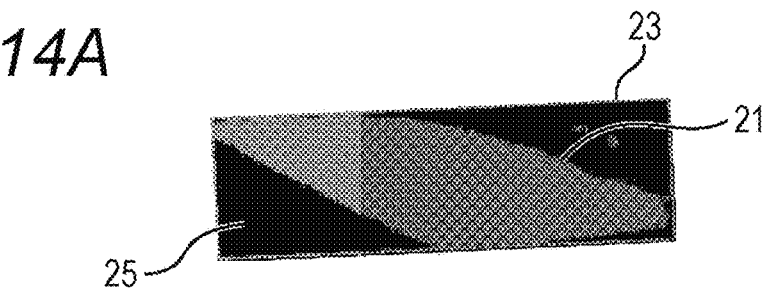
FIG. 14A, FIG. 14B and FIG. 14C is a process diagram illustrating a process of obtaining a maximum value of a length of the gas region along a direction of the average movement vector.
Figure 14B:
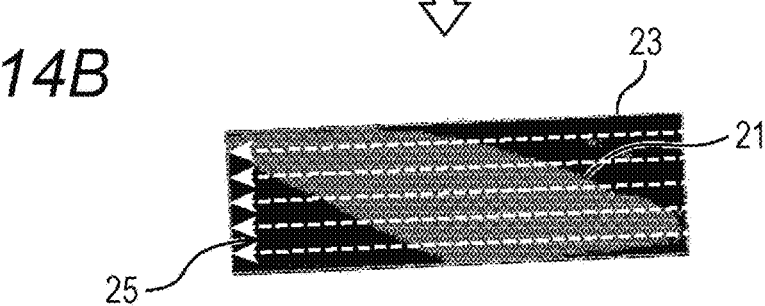
Figure 14C:
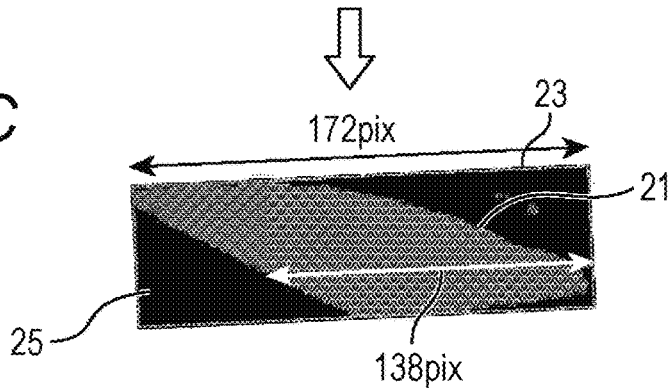

FIG. 14A to FIG. 14C are process diagrams illustrating a process of obtaining a maximum value of the length of the gas region 21 along the direction of the average movement vector 22. First, the passage time calculation unit 95 (FIG. 11) cuts out a portion in which the circumscribed rectangle 23 is set from the image Im9 illustrated in FIG. 13 (FIG. 14A). The passage time calculation unit 95 scans the cut out portion and calculates the number of pixels in the gas region 21 along a scanning direction (FIG. 14B). The scan direction is the direction of the average movement vector 22. The passage time calculation unit 95 moves the start point of scanning in a direction orthogonal to the direction of the average movement vector 22 and repeats the scanning. The passage time calculation unit 95 assumes the maximum value of the numbers of pixels of the gas region 21 along the scanning direction as the length of the gas region 21 along the direction of the average movement vector 22 (FIG. 14C). Here, 138 pix is the maximum value.

In FIG. 14A to FIG. 14C, directions of two sides out of four sides forming the circumscribed rectangle 23 are the same as the directions of the average movement vector 22, and the directions of the remaining two sides are perpendicular to the directions of the average movement vector 22. However, the directions of the four sides forming the circumscribed rectangle 23 are not limited to this and may be arbitrary. The scanning direction is only necessary to be the direction of the average movement vector 22.

When the scanning direction is the same as the vertical direction or the horizontal direction of the image illustrated in FIG. 14A to FIG. 14C, the calculation process of the number of pixels becomes simple. Therefore, the passage time calculation unit 95 may rotate the image illustrated in FIG. 14A to FIG. 14C and set the vertical direction or the horizontal direction of this image to be the same as the scanning direction.

The passage time calculation unit 95 substitutes 138 pix and 25.5 pix/sec (the length of the average movement vector 22) into Equation 3. Thus, the gas passage time is calculated to be 4.58 sec.

138 pix/25.5 pix/s=4.58 sec

The gas volume is the same as the value obtained in the above embodiment (6.095 L).

The estimated value calculation unit 97 (FIG. 11) substitutes 6.095 L (gas volume) and 4.58 sec (gas passage time) into Equation 1. Thus, the estimated value of the gas flow rate is calculated to be 79.8 L/min.

6.095 L/4.58 sec×60=79.8 L/min

Since the actual value of the gas flow rate is 78 L/min, according to the second modification example, the estimated value of the gas flow rate becomes quite close to the actual value of the gas flow rate.

Although the embodiment, the first modification example, and the second modification example use the circumscribed rectangle 23 of the gas region 21, it may be a rectangle corresponding to the gas region 21. This will be described in detail. It is assumed that the rectangle is formed by a first side and a second side that are parallel to the direction of the average movement vector 22, and a third side and a fourth side that are perpendicular to the direction of the average movement vector 22. The first side and/or the second side may be located outside the gas region 21, but it is not preferable that they are located inside the gas region 21. This is because a part of the gas region 21 is not considered in calculation of an estimated value of the gas flow rate, and the estimated value smaller than the actual value of the gas flow rate is calculated.

The third side and/or the fourth side may be located inside the gas region 21, but it is not preferable that they are located outside the gas region 21. The distance between the third side and the fourth side is related to the gas passage time, and the longer the distance, the longer the gas passage time. When the third side and/or the fourth side is located outside the gas region 21, the region between the gas region 21 and the third side (fourth side) is taken into account for the gas passage time even though the gas has not passed therethrough. Therefore, the gas passage time becomes long, and an estimated value smaller than the value of an actual gas flow rate is calculated.

When it is a rectangle with the third side and the fourth side being located inside the gas region 21, the gas passage time is shorter than the actual gas passage time. Since the gas volume is calculated based on the pixels in the rectangle, the estimated value can be brought close to the value of the actual gas flow rate.

Figure 15:
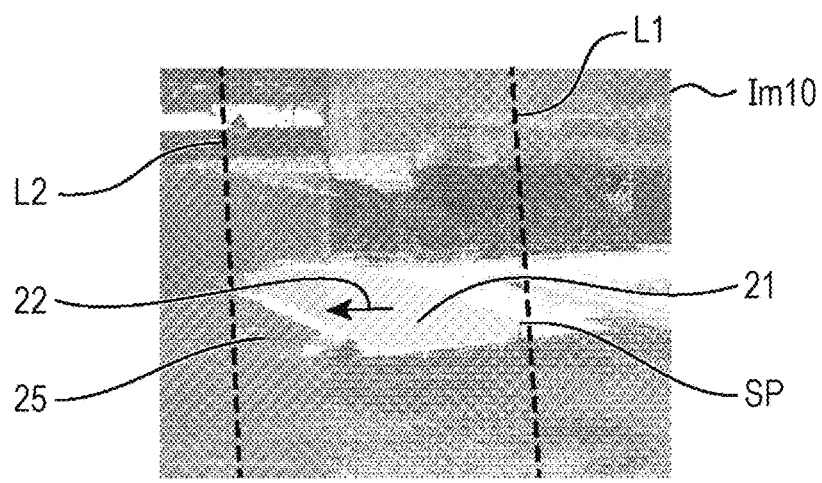
FIG. 15 is an image view illustrating an image in which two lines are set to the image illustrated in FIG. 8.
Figure 16:
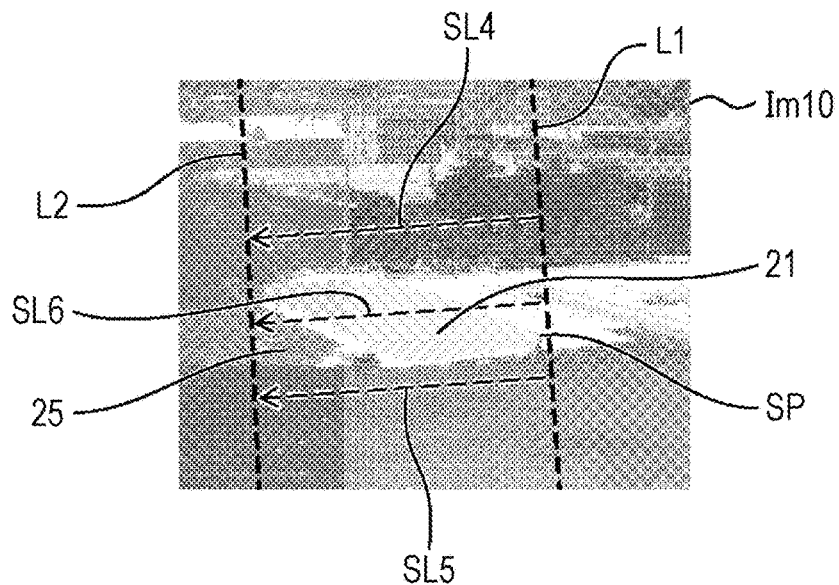
FIG. 16 is an image view illustrating a state where the image illustrated in FIG. 15 is being scanned.
Figure 17:
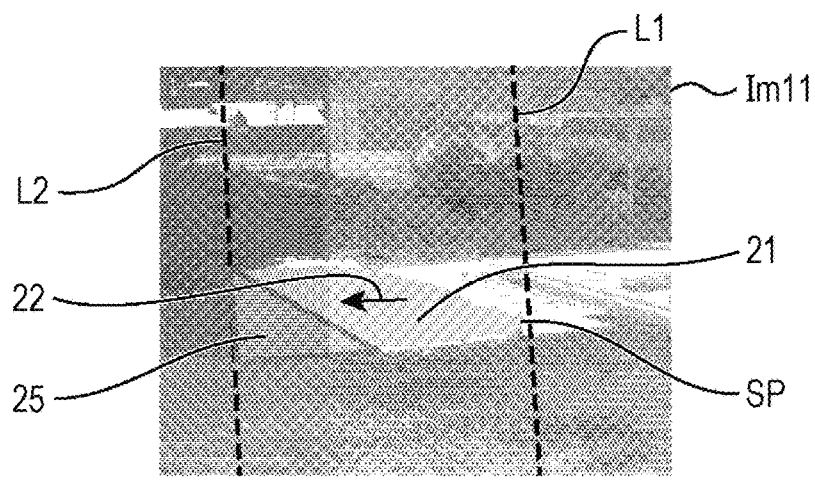
FIG. 17 is an image view illustrating an image in which the non-gas region found by scanning is combined with the image illustrated in FIG. 15.

With reference to FIG. 13, in the first and second modification examples, the circumscribed rectangle 23 is set to find the non-gas region 25, but it is not limited to this. For example, two lines L1, L2 that are perpendicular to the direction of the average movement vector 22 and are in contact with the gas region 21 may be set. FIG. 15 is an image view illustrating an image Im10 in which two lines L1, L2 are set to the image Im6 illustrated in FIG. 8. FIG. 16 is an image view illustrating a state where the image Im10 illustrated in FIG. 15 is being scanned. FIG. 17 is an image view illustrating an image Im11 in which the non-gas region 25 found by scanning is combined with the image Im10 illustrated in FIG. 15. In FIG. 17, in order to clarify the non-gas region 25, the non-gas region 25 is illustrated by one pixel value. In the case of the first modification example, the gas volume calculation unit 96 (FIG. 11) calculates the area of the gas region 21 by using above Equation 4 with the number of pixels of the non-gas region 25 being the area of the non-gas region 25.

The non-gas region 25 may be found by the non-gas region determination unit 98 (FIG. 11) or may be found by the user. The former will be described first. With reference to FIG. 15, the non-gas region determination unit 98 sets lines L1, L2 for the image Im6 illustrated in FIG. 8. With reference to FIG. 16, the non-gas region determination unit 98 scans a region defined by the line L1 and the line L2 along the direction of the average movement vector 22, and performs a search within this region for whether or not the non-gas region 25 is present on the downstream side of the gas region 21. For example, a scanning line SL4 and a scanning line SL5 do not pass through the gas region 21. Therefore, the non-gas region 25 is not present on the scanning lines SL4 and SL5. A scanning line SL6 passes through a region other than the gas region, the gas region 21, and a region other than the gas region. After passing through the gas region 21, the scanning line SL6 passes through a region other than the gas region, and this region is a non-gas region 25 located on the downstream side of the gas flow. When the non-gas region determination unit 98 has found the non-gas region 25 as a result of the search, the non-gas region determination unit 98 determines that there is a non-gas region 25.

A case where the user finds the non-gas region 25 will be described. With reference to FIG. 15, when the user sees the image Im10 displayed on the display 11 and finds that there is a non-gas region 25 on the downstream side of the gas region 21 within the region defined by the lines L1 and L2, the user sets the range of the non-gas region 25 in the image Im10 by using the input unit 12. Thus, the non-gas region determination unit 98 determines that there is a non-gas region 25.

Figure 18:
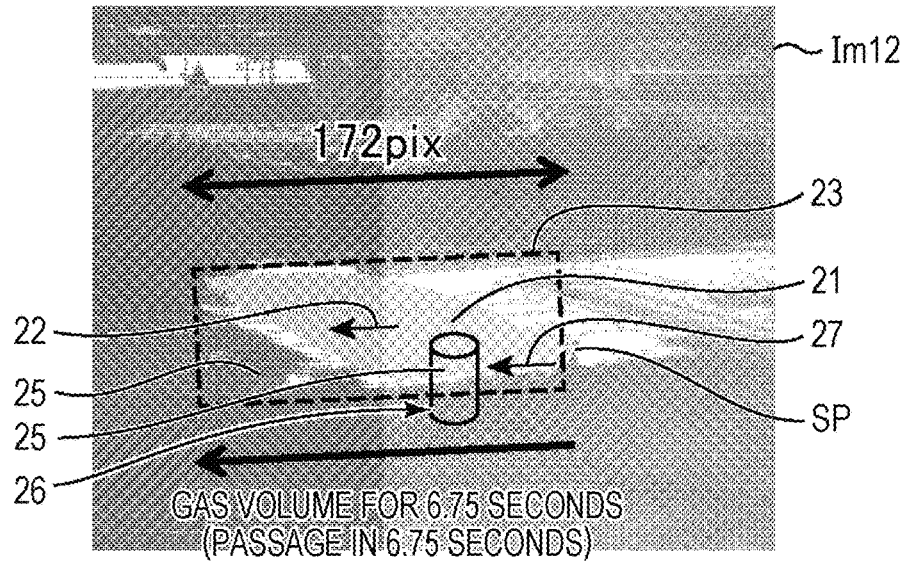
FIG. 18 is an image view illustrating an image in which an image of a structure is added to the image illustrated in FIG. 9.

In the first embodiment and the second modification example, the case where the non-gas region 25 exists outside the gas region 21 is described (for example, FIG. 9). However, the non-gas region 25 may be within the gas region 21. For example, there is an object (for example, a structure) between the leaked gas and the infrared camera 2. This will be described. FIG. 18 is an image view illustrating an image Im12 in which an image 26 of a structure is added to the image Im7 illustrated in FIG. 9. Since the structure exists between the leaked gas and the infrared camera 2, a part of the gas region 21 overlaps with the image 26 of the structure. This part becomes the non-gas region 25 on the downstream side of a gas flow direction 27.

Summary of Embodiments

A gas flow rate estimation device according to a first aspect of an embodiment includes a first calculation unit that calculates, by using an average movement vector of a gas region included in an image, a gas passage time for leaked gas to pass through the gas region, a second calculation unit that calculates a gas volume in the gas region by using a gas concentration thickness product of the gas region, and a third calculation unit that calculates an estimated value of a flow rate of the gas by using the gas passage time and the gas volume.

The average movement vector of the gas region (in other words, an image of a gas cloud) may be, for example, an average value of movement vectors of pixels constituting the gas region, or the gas region may be divided into small areas larger than one pixel (for example, 2×2 pixels), and an average value of movement vectors of the small areas may be used. All of the movement vectors may be used for calculating the average value, or an average value of sampled movement vectors (for example, a movement vector sampled every two vertical and horizontal pixels) may be used.

The gas passage time is calculated, for example, by dividing a length of the gas region along a direction in which the gas flows by a length of the average movement vector. The length of the gas region along the direction in which the gas flows may be, for example, a length of a rectangle of the gas region along a direction of the average movement vector, or a maximum value of a length of the gas region along the direction of the average movement vector.

The gas volume is calculated, for example, by multiplying an area of the gas region and an average value of the gas concentration thickness products of the gas region. All of the gas concentration thickness products of the pixels constituting the gas region may be used for calculating the average value of the gas concentration thickness products, or an abnormal value among the gas concentration thickness products of the pixels constituting the gas region may be omitted.

The estimated value of the gas flow rate is calculated, for example, by dividing the gas volume by the gas passage time.

As described above, by the gas flow rate estimation device according to the first aspect of the embodiment, the gas flow rate can be estimated relatively easily based on the gas region included in the image.

In the above configuration, a determination unit that determines whether or not there is a non-gas region on a downstream side of a flow of the gas is further provided.

Within the rectangle of the gas region, the gas region may be interrupted on the downstream side of the flow of the gas, and a non-gas region may exist. This non-gas region can be assumed as a missing part of the gas region. If the estimated value of gas flow rate is calculated without considering the non-gas region, the estimated value may differ significantly from an actual gas flow rate. This configuration determines whether or not there is a non-gas region on the downstream side of the flow of the gas within the rectangle of the gas region.

The determination unit may find the non-gas region by performing image processing on an image including the gas region in which the rectangle is set, or the user may find the non-gas region by seeing the image including the gas region in which the rectangle is set. In a case where the determination unit finds the non-gas region, when the determination unit finds the non-gas region, the determination unit determines that there is a non-gas region. In a case where the user finds the non-gas region, when the user finds the non-gas region and sets the non-gas region in the gas flow rate estimation device, the determination unit determines that there is a non-gas region.

In the above-described configuration, when the determination unit has determined that the non-gas region exists, the second calculation unit includes the non-gas region in the gas region and calculates the gas volume.

The second calculation unit includes the non-gas region in the gas region (in other words, assumes the non-gas region as a part of the gas region) and calculates the gas volume. Therefore, with this configuration, the estimated value of the gas flow rate can be calculated in consideration of the non-gas region.

In the above configuration, when the determination unit has determined that the non-gas region exists, the first calculation unit calculates the gas passage time by using a maximum value of a length of the gas region along a direction of the average movement vector and the average movement vector.

According to this configuration, the gas passage time is calculated without including the non-gas region in the gas region. Therefore, the estimated value of the gas flow rate can be close to an actual gas flow rate.

A gas flow rate estimation method according to a second aspect of an embodiment includes a first calculation step of calculating, by using an average movement vector of a gas region included in an image, a gas passage time for leaked gas to pass through the gas region, a second calculation step of calculating a gas volume in the gas region by using a gas concentration thickness product of the gas region, and a third calculation step of calculating an estimated value of a flow rate of the gas by using the gas passage time and the gas volume.

The gas flow rate estimation method according to the second aspect of the embodiment defines the gas flow rate estimation device according to the first aspect of the embodiment from the viewpoint of a method, and has similar operations and effects to those of the gas flow rate estimation device according to the first aspect of the embodiment.

A gas flow rate estimation program according to a third aspect of an embodiment includes a first calculation step of calculating, by using an average movement vector of a gas region included in an image, a gas passage time for leaked gas to pass through the gas region, a second calculation step of calculating a gas volume in the gas region by using a gas concentration thickness product of the gas region, and a third calculation step of calculating an estimated value of a flow rate of the gas by using the gas passage time and the gas volume.

The gas flow rate estimation program according to the third aspect of the embodiment defines the gas flow rate estimation device according to the first aspect of the embodiment from the viewpoint of a program, and has similar operations and effects to those of the gas flow rate estimation device according to the first aspect of the embodiment.

Although embodiments of the present invention have been illustrated and described in detail, they are merely illustrations and examples and are not limitations. The scope of the invention should be construed by the wording of the accompanying claims.

Japanese Patent Application No. 2018-222126, filed Nov. 28, 2018, the entire disclosure of which is incorporated herein by reference in its entirety.

INDUSTRIAL APPLICABILITY

According to the present invention, it is possible to provide a gas flow rate estimation device, a gas flow rate estimation method, and a gas flow rate estimation program.

The invention claimed is:

1. A gas flow rate estimation device comprising:
a hardware processor that:
calculates, by using an average movement vector of a gas region included in an image, a gas passage time for leaked gas to pass through the gas region;
calculates a gas volume in the gas region by using a gas concentration thickness product of the gas region; and
calculates an estimated value of a flow rate of the gas by using the gas passage time and the gas volume,
wherein the hardware processor calculates the gas passage time by using a maximum value of a length of the gas region along a direction of the average movement vector and the average movement vector.

2. The gas flow rate estimation device according to claim 1, wherein the hardware processor calculates the gas volume by using an area of the gas region and an average value of the gas concentration thickness products of the gas region.

3. The gas flow rate estimation device according to claim 2, wherein the hardware processor determines whether or not there is a non-gas region on a downstream side of a flow of the gas.

4. The gas flow rate estimation device according to claim 1, wherein the hardware processor determines whether or not there is a non-gas region on a downstream side of a flow of the gas.

5. The gas flow rate estimation device according to claim 4, wherein when the hardware processor has determined that the non-gas region exists, the second calculator includes the non-gas region in the gas region and calculates the gas volume.

6. A gas flow rate estimation method comprising:
calculating, by using an average movement vector of a gas region included in an image, a gas passage time for leaked gas to pass through the gas region;
calculating a gas volume in the gas region by using a gas concentration thickness product of the gas region; and
calculating an estimated value of a flow rate of the gas by using the gas passage time and the gas volume,
wherein the calculating the gas passage time includes calculating the gas passage time by using a maximum value of a length of the gas region along a direction of the average movement vector and the average movement vector.

7. A non-transitory recording medium storing a computer readable gas flow rate estimation program that causes a computer to execute:
calculating, by using an average movement vector of a gas region included in an image, a gas passage time for leaked gas to pass through the gas region;
calculating a gas volume in the gas region by using a gas concentration thickness product of the gas region; and
calculating an estimated value of a flow rate of the gas by using the gas passage time and the gas volume,
wherein the calculating the gas passage time includes calculating the gas passage time by using a maximum value of a length of the gas region along a direction of the average movement vector and the average movement vector.

* * * * *